United States Patent [19]
Appleford

[11] Patent Number: 5,494,110
[45] Date of Patent: Feb. 27, 1996

[54] TWO-PART CONNECTOR FOR FLUID CARRYING CONDUITS

[75] Inventor: David E. Appleford, Essex, Great Britain

[73] Assignee: Alpha Thames Engineering Limited, England

[21] Appl. No.: 240,653

[22] PCT Filed: Aug. 1, 1994

[86] PCT No.: PCT/GB92/02082

§ 371 Date: Jun. 13, 1994

§ 102(e) Date: Jun. 13, 1994

[87] PCT Pub. No.: WO93/10327

PCT Pub. Date: May 27, 1993

[30] Foreign Application Priority Data

Nov. 11, 1991 [GB] United Kingdom ............... 9123928

[51] Int. Cl.[6] ................................. E21B 43/01
[52] U.S. Cl. ............... 166/339; 166/344; 166/347
[58] Field of Search .................... 166/97.5, 316, 166/339–342, 344, 347, 348, 359, 360

[56] References Cited

U.S. PATENT DOCUMENTS

| | | | |
|---|---|---|---|
| 3,095,007 | 6/1963 | Allen | 166/97.5 X |
| 3,545,490 | 12/1970 | Burrus | 137/614.06 |
| 3,601,190 | 8/1971 | Mott | 166/85 |
| 3,732,923 | 5/1973 | Fowler | 166/347 X |
| 4,260,022 | 4/1981 | Van Bilderbeek | 166/339 |
| 4,284,142 | 8/1981 | Kirkland | 166/381 X |
| 4,295,484 | 10/1981 | Meisenheimer, Jr. | 137/68 R |
| 4,319,637 | 3/1982 | Wilson | 166/316 X |
| 4,404,989 | 9/1983 | Lemoine | 166/344 X |
| 4,436,157 | 3/1984 | Kingwood | 166/344 |
| 4,637,470 | 1/1987 | Weathers et al. | 166/344 |
| 4,721,132 | 1/1988 | Houlgrave | 137/614.06 |

FOREIGN PATENT DOCUMENTS

| | | |
|---|---|---|
| 0238117 | 9/1987 | European Pat. Off. . |
| 0441727 | 8/1991 | European Pat. Off. . |
| 0457700 | 11/1991 | European Pat. Off. . |
| 2444153 | 7/1980 | France . |
| 426278 | 4/1935 | United Kingdom . |
| 844258 | 8/1960 | United Kingdom . |
| 2027150 | 2/1980 | United Kingdom . |
| 2038906 | 7/1980 | United Kingdom . |
| 2186345 | 8/1987 | United Kingdom . |
| 2249149 | 4/1992 | United Kingdom . |
| 2251907 | 7/1992 | United Kingdom . |
| WO8401610 | 4/1984 | WIPO . |
| WO89/03002 | 4/1989 | WIPO . |

*Primary Examiner*—Roger J. Schoeppel
*Attorney, Agent, or Firm*—Biebel & French

[57] ABSTRACT

A two-part connector for use in connecting and disconnecting fluid carrying conduits includes male and female connector parts each having sets of non-radially disposed fluid carrying bores therethrough. A rotatable valve member extends across each set of bores therethrough and is adapted to align with the bores in the connector part in which the valve member is mounted. Each of the bores in the male connector part is aligned with a respective bore in the female connector part when the two connector parts are assembled together. Each valve member is rotatable to a first position in which the holes therein are aligned with the bores in the connector parts to permit fluid flow and to a second position in which the body of the valve member obturates the bores so that no fluid flows therethrough. Releasable clamping means retain the two connector parts together in sealing engagement.

13 Claims, 8 Drawing Sheets

TWO-PART CONNECTOR FOR FLUID CARRYING CONDUITS

BACKGROUND OF THE INVENTION

The present invention relates to a connector for use in connecting and disconnecting fluid carrying conduits. The connector is particularly suitable for use in subsea locations where it is necessary to connect and disconnect oil and/or gas carrying conduits to and from subsea production modules and pipelines although this subsea use of the connector is preferred rather than essential as the connector can equally well be used in a land or platform based application.

The need for economical development of marginal gas or oil fields is increasing. Such fields are often beyond the range of multiphase flow to an existing platform facility and too small to justify the construction of a new facility. In these cases, the option of single stage separation on the sea bed and boosting back to an existing facility becomes very attractive.

The increasing use of modularised processing systems for water depths of 60–180 meters has been brought about by the need to reduce the subsea installation and maintenance time. The use of interchangeable modules in a subsea system requires the need for suitable two-part connectors which will enable the module to be lowered into position and connected up to the gas/oil supply and also removed therefrom by means operated from the surface.

A connector of this type is disclosed in published PCT specification No. WO 89/03002 which describes a connector for use in connecting and disconnecting fluid carrying conduits of the "plug and socket" type. The connector comprises co-operating parts in the form of a female part to be mounted on a subsea module and a complementary male part over which the female part fits. Each of the female and male parts are provided with a plurality of bores which can be connected to fluid carrying conduits. Tapered cylindrical sleeves are provided on the male and female parts respectively which have respective ports therein for intercommunicating the respective bores to permit fluid flow through the communicated bores and thus through the connector. These cylindrical sleeves can be rotated to discommunicate the bores and stop fluid flow through the bores and thus through the connector in which position, the two connector parts can be disconnected. This connector also has a central guide passage in it which receives a guide post used to properly orientate the two connector parts during connection. Because of this central guide passage, the fluid carrying bores through the connector have to follow a tortuous path in that their inlet ducts have to be disposed radially around the central guide passage whereas the outlet ducts connected thereto run parallel to the central guide passage thereby creating a right angle in the flow path through the connector. This acute bend in the flow path is highly undesirable as it restricts the possibility of "pigging" of the pipeline connected to the connector for cleaning purposes as the pig cannot readily pass through the connector due to the tortuous path of the fluid conduits in it. A further disadvantage of this construction is that significant pressure losses occur due to the tortuous path of the fluid conduits. This is highly undesirable as many processing operations are sensitive to pressure losses. A further disadvantage of this construction is that the gas/oil carrying conduits passing through the connector must by-pass this central passage which restricts the number of conduits which can be accommodated in the connector.

SUMMARY OF THE INVENTION

It is an object of the present invention therefore to provide an improved two-part connector which overcomes or substantially reduces the problems of the prior art connector just described in that the connector includes a valve system which permits the fluid conduits which pass through the connector to be of a configuration such that "pigging" of a pipeline connected to the connector part is possible.

According to the invention there is provided a two-part connector for use in connecting and disconnecting fluid carrying conduits comprising a male and female connector part each having at least one non-radially disposed fluid carrying bore therethrough, and a rotatable valve member extending across the or each bore with at least one throughhole adapted to align with the or each of said bores, the or each bore in the male connector part being aligned with the or each bore in the female connector part when the two connector parts are assembled together, and the or each valve member being rotatable to a first position in which the or each through-hole therein is aligned with the or each bore to permit fluid flow and to a second position in which the body of the valve member obturates the or each bore so that no fluid flows therethrough, and releasable clamping means to retain the two connector parts together in sealing engagement, characterised in that the or each valve member has a plurality of through-holes therein, each of which is surrounded by an annular seal which co-operates with the connector part in which the valve member is rotatably mounted to make a seal therewith.

Preferably, a plurality of bores are provided in each connector part, the bores in the male and female connector parts being axially aligned in sets with one of said valve members extending across all the bores in one of said sets.

Preferably all the bores are parallel with each other and coaxial with the longitudinal axis of the connector along the whole of their length. This has the advantage of permitting a large number of through-bores to be provided in each connector part which increases the performance of the connector as more pipelines can be connected thereto.

Preferably the or each valve member is a generally cylindrical rod or spindle which extends through and across the bores, the or each spindle having a plurality of passages therethrough corresponding to the number of bores it tranverses in its respective connector part.

Preferably, the valve members are rotatable about their longitudinal axis on demand to their open or closed positions by suitable means provided on each connector part which can take the form of hydraulic or electric means. In one embodiment, the means for rotating each valve member comprises a gear wheel connected to hydraulic or electric means which, when rotated, co-operates with a correspondingly geared drive on each valve member to rotate it. In a preferred embodiment, each valve member is a spindle, one of the spindles in the female connector part is rotatable by drive means connected thereto, and first gear means are associated with said spindle which, in use, mesh with second gear means provided on the or each spindle on the male connector part when the two connector parts are clamped together by the releasable clamping means.

Preferably, the first gear means is a gear wheel mounted on the female connector valve spindle and the second gear means is a ring gear provided on the or each spindle on the male connector part which meshes therewith.

Other suitable drive means can be used. For instance, each valve member can have a rotatable drive member provided thereon which includes a slot radially offset with respect to the valve members axis of rotation, said offset slot being adapted to receive a projection such as a peg provided on an actuator movable in a plane generally normal to said axis of rotation of the valve member. Conveniently, the or each actuator is movable between a first closed position in which the valve members obturate the bores and prevent fluid flow therethrough and a second open position allowing fluid flow through the bores.

Preferably, an actuator is provided at both ends of each valve member. However, individual actuators which co-operate with each valve member could be provided.

In a preferred embodiment, the male connector part has a sealing surface adapted to co-operate with a sealing surface on the female part to make a metal to metal seal therewith.

Annular seals are also preferably circumferentially located between each aperture through the valve spindle and these also co-operate with the connector part receiving said spindle to make a seal therewith.

Preferably, the clamping means includes anchor means provided on one of the connector parts which are engaged by latching means on the other connector part, the clamping means also including tensioning members operably associated with locking means to releasably clamp and retain the two connector parts together under pressure. On initial activation of the clamping means, the latching means is caused to move axially against the anchor means to draw the two connector parts together. The tensioning members are then extended and elongated axially using suitable means such as hydraulic rams and/or a cam system whereby a locking arrangement associated therewith is activated to maintain said extension and clamp the two connector parts together under pressure.

In one preferred arrangement, the axially extendable members are steel rods connected at each end to a top and bottom ring, the arrangement being such that when the rods have been extended, locking means are engaged with the top ring to maintain the rods in their extended condition. The locking means can take the form of locking chocks or slips which engage with the top ring to retain it in its clamped position or the top ring can be connected to the body of the top connector part by over-centre means which achieve the same effect when moved to their clamping position.

BRIEF DESCRIPTION OF THE DRAWINGS

Preferred embodiments of the invention will now be described, by way of example only, with reference to the accompanying drawings, in which:

FIGS. 9-14 show various views of a modified two part connector of the invention as follows:

DESCRIPTION OF THE PREFERRED EMBODIMENTS

Figure 1:
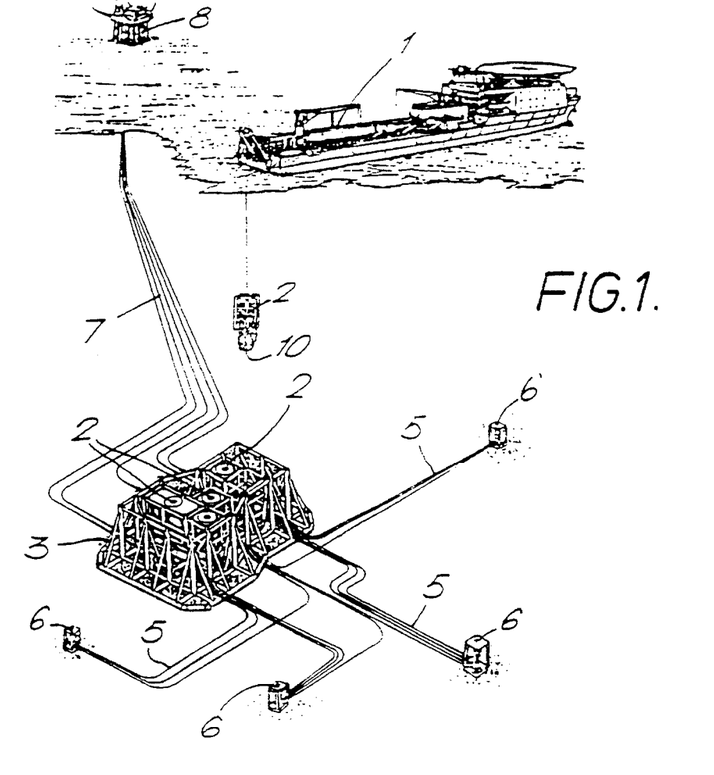
FIG. 1 illustrates a modularised subsea processing system.

Referring to FIG. 1, there is shown an off-shore oil or gas installation which comprises a plurality of subsea production modules 2 which are individually supported in a framework 3 located on the seabed. Oil, gas and water is fed from wells 6 via pipelines 5 to the individual modules 2 where it is separated into its individual components and then fed via pipelines 7 to a platform 8. Each module 2 is lowered from surface vessel 1 into the framework 3 and can be removed therefrom in the same way. Each module 2 has a two-part connector 10 at its lower end (illustrated schematically but to be described in more detail hereafter) to enable it to be connected or disconnected from the pipelines 5 and 7.

The illustrated system is a modularised processing system for use in water depths of 60–180 m and can provide subsea liquid/gas separation and single phase liquid boosting at a rate of 15,000 barrels per day to an existing facility which can be up to 50 km away. One of the modules 2 in a typical installation would be a retrievable control and chemical injection module and the system is specifically designed for the liquid and gas export lines to be capable of being "pigged". The modularisation is based around a single datum using multiported connectors 10 which have the facility to shut off both the male and female connector halves prior to disconnection when the module is to be retrieved. This allows all valves and equipment in the subsea installation to be retrievable to the surface should maintenance be required. The illustrated system is an intermediate stage to providing a completely diverless subsea system. Diver assistance will be necessary for initial installation but diver intensive maintenance and retrieving procedures which are necessary with known systems are avoided.

Figure 2:
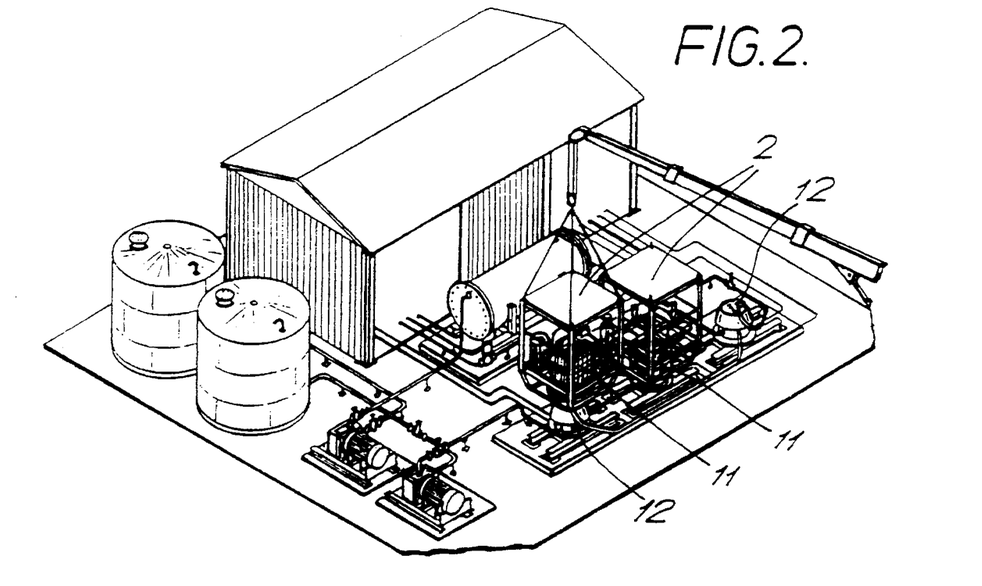
FIG. 2 illustrates a modularised on-shore processing system for testing connectors.

FIG. 2 illustrates an on-shore site for testing connectors. The illustrated arrangement comprises a testing station to which malfunctioning modules 2 can be transported and lowered into position for testing, a male part 12 of a two-part connector 10 being installed in the on-shore installation ready to receive the female part 11 of the connector which is located at the bottom of the module 2. Once in position on the male part 12, the testing system can be operated and the module 2 thoroughly checked to locate any malfunction. A newly manufactured module 2 can also be tested in the illustrated installation prior to installation in a subsea installation or elsewhere.

Although the connectors are illustrated in a situation where they are lowered into position and lifted therefrom with the female part of the connector forming the bottom half of the connector, it is envisaged within the scope of the present invention that the connector could be used in an installation operating in a different orientation. For instance, the female part of the connector could be located at the top of a supporting framework and the module 2 raised up and brought into connection with it. Side connection is also envisaged.

Figure 3:
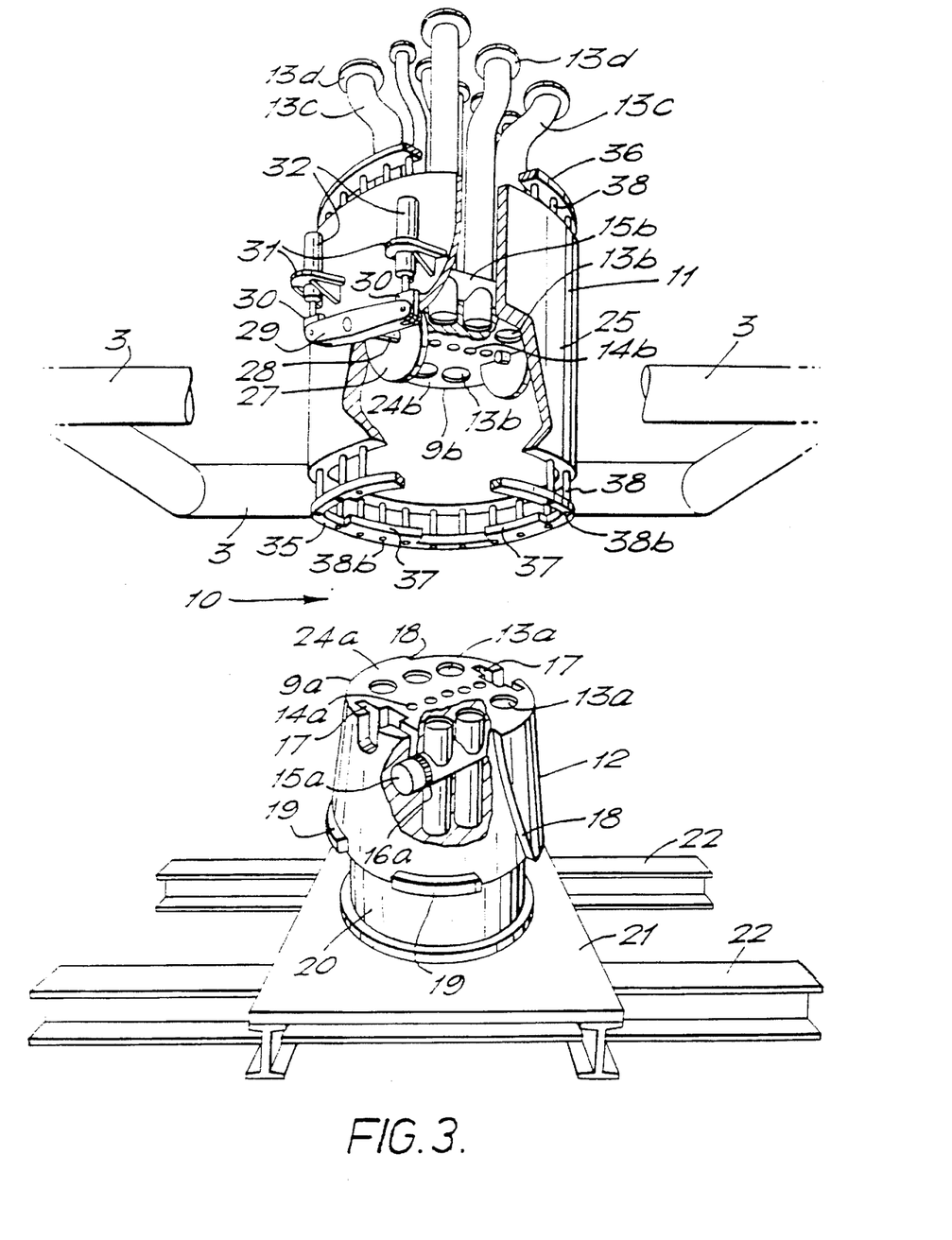
FIG. 3 is a perspective view of one form of two part connector of the invention.
Figure 4A:
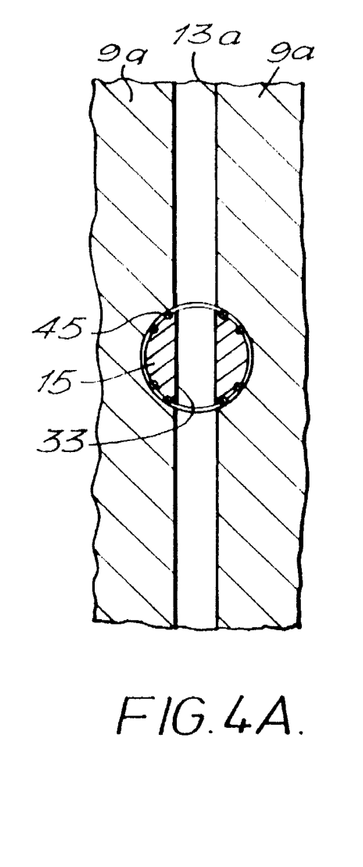
FIGS. 4A-4C are cross sectional views of one of the valve members incorporated in the male and female connectors parts shown in FIG. 3.
Figure 4B:
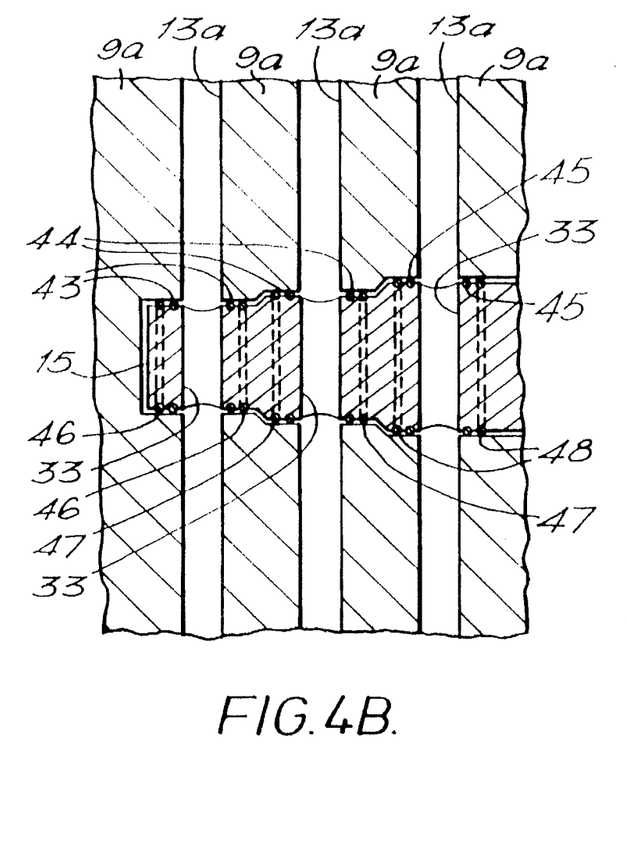
Figure 4C:
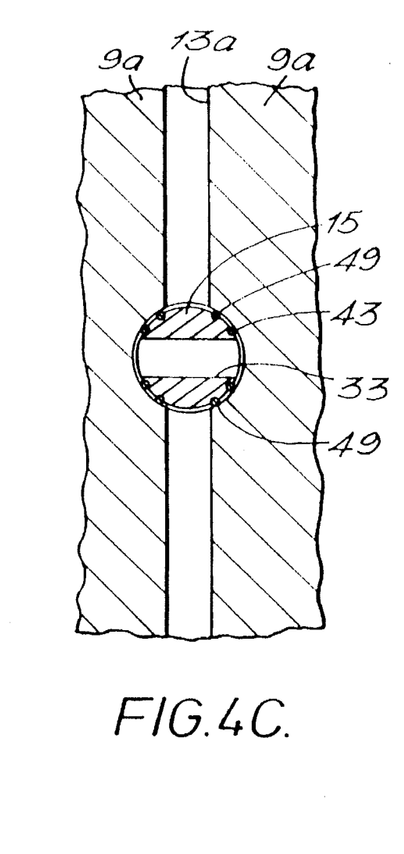
Figure 5:
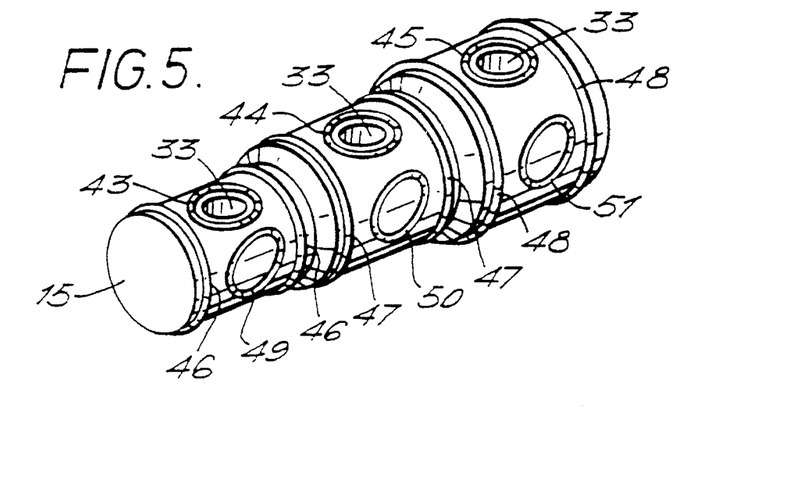
FIG. 5 is a perspective view of one of the valve members shown in FIGS. 3 and 4.

Referring now to FIGS. 3–5, there is shown in FIG. 3 a two-part connector 10 of the present invention. It can be seen that the connector comprises an upper female part 11 and a lower male part 12. The male part 12 has a block 9a which stands on a pedestal 20. In the illustrated embodiment, the pedestal 20 is supported on a platform 21 resting on girders 22. The block 9a is generally frusto-conical and is provided on its diametrically opposed faces with a guide scroll 18. Locating projections 19 are provided around the bottom periphery of the block 9a. Only four are illustrated but any number could be provided. Six main bores or ducts 13a extend vertically through the block 9a parallel to the longitudinal axis thereof and parallel to each other, the ducts being arranged in linear sets of three. Five smaller ducts 14a also extend through the block 9a between the pairs of main ducts 13a. These ducts 14a are also parallel to each other and parallel to the longitudinal axis of the block and arranged in a line. The block 9a has a planar upper surface 24a in which recesses 17 are provided diametrically opposite each other and between the main ducts 13a. A respective cut-out 23 communicates with each recess 17. A rotatable valve member 15a in the form of a spindle extends normally through each main duct 13a and each smaller duct 14a. Each spindle has a through-bore 33 (see FIG. 4) which can be aligned with the main ducts 13a to permit fluid flow therethrough. Each spindle valve 15a is rotatable about its longitudinal axis to rotate its through-bores 33 through 90° to a second position in which the body of the spindle valve 15a obturates the main and smaller ducts 13a and 14a in the block 9a and prevents fluid flow therethrough. This procedure will be described in more detail with reference to later figures of the drawings. A spindle valve 15a is provided in each set of main ducts 13a and smaller ducts 14a and a ring gear 16a is provided at each end of the spindle 15a which projects into the bottom region of the recesses 17.

Although not illustrated, the ducts 13a and 14a extend beyond the bottom of the pedestal 20 and are provided with flange connections for permanent connection to the pipelines 6.

The female connector part 11 is similar in construction to the male part 12 in many respects in that it also includes a block 9b through which main ducts 13b are formed parallel to each other and parallel to the longitudinal axis of the block, the ducts being arranged in linear sets of three.

Secondary ducts 14b are formed through the block 9b between the main ducts 13b parallel to the longitudinal axis of the block and parallel to each other, these ducts also being arranged in a line. The block also includes a planar sealing surface 24b. Spindle valve members 15b extend transversely across the main ducts 13b and the smaller ducts 14b in the same way as has been described with reference to the male part 12 of the connector. Each spindle valve member 15b has a ring gear (not shown) provided at its opposite ends which protrude from the block 9b.

The block 9b is preferably mounted in a tapered sleeve 25 which is dimensioned to fit exactly over the frusto-conical block 9a of the male connector part 12. A shaft 28 is mounted in bearings in the sleeve 25 to be rotatable therein and a gear wheel 27 is fitted to the end of the shaft 28 inside the sleeve 25. A pivot lever 29 is attached to the other end of the shaft 28 and each end of this lever 29 is connected by a pivot 30 to a hydraulic ram 32 mounted in a bracket 31 attached to the outer surface of the sleeve 25.

Steel rods 38 are slidably fitted in bores (not shown) provided in the sleeve 25. This however is not essential as can be seen from the embodiment illustrated in FIGS. 9–15. The upper ends of these rods 38 have a top ring 36 loosely attached thereto by bolts 38a (see FIG. 6) whereas the bottom ends of the rods 38 have a castellated bottom ring 35 loosely attached thereto by bolts 38b (see FIG. 3). Castellations 37 (only four are shown but any number can be provided) are adapted to fit between the projections 19 at the base of the male connector part 12 and locate under the projections 19 when the female part 11 is rotated with respect to the male part 12.

Figure 6:
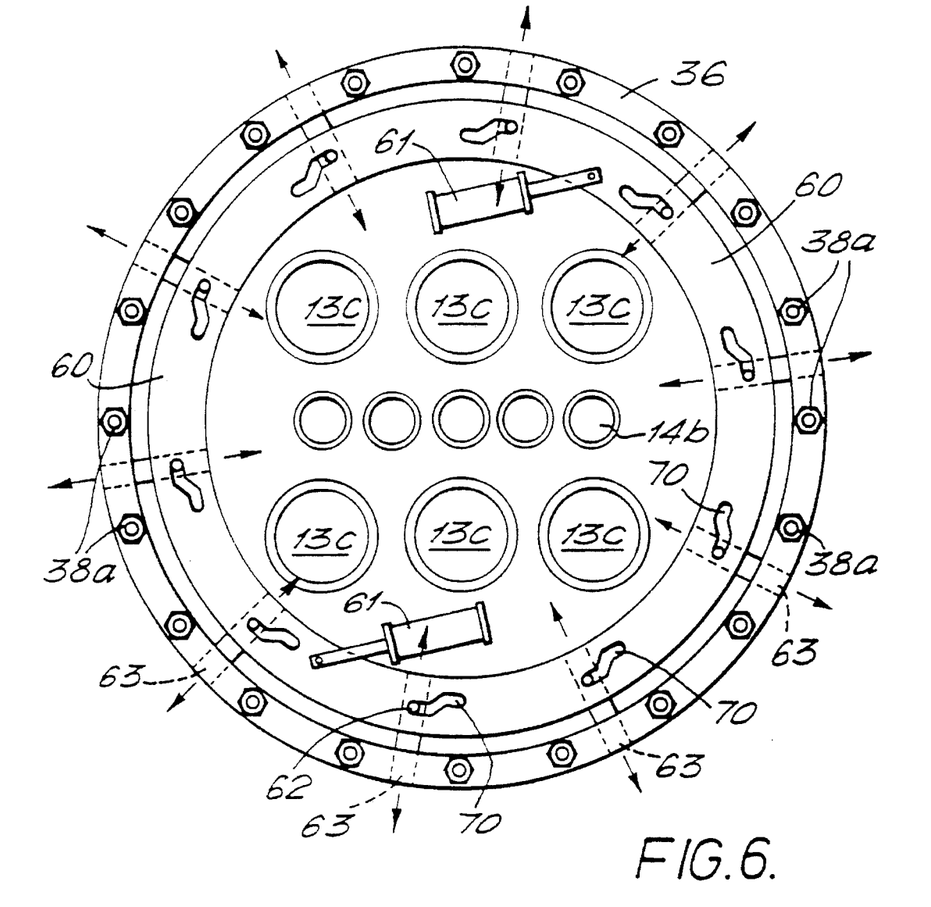
FIG. 6 is a plan view of the top connector part shown in FIG. 3 and shows a preferred form of clamping mechanism to retain the two connector parts together.

Referring now to FIG. 6, it can be seen that the top connector part 11 includes a rotatable ring 60 having a plurality of slots 70 therein shaped as illustrated. The ring 60 is rotatable by hydraulic rams 61 connected thereto only two of which are illustrated. More rams arranged differently can however be used if desired. Radially movable fingers 63 are circumferentially located around the periphery of the connector below the rotatable ring 60 and each finger has an upstanding peg 62 at its inner end which engages in one of the slots 70. The outer end of each finger is connected to an over-centre lever mechanism such as that illustrated in FIG. 7. This comprises an upper link 64 pivotally attached at one end to the finger 63 and at its other end to the ring 36 and a lower link 65 which is pivotally attached at one end to the finger 63 and at its other end to the body 25 of the upper connector part 11 (not visible in FIG. 6).

Figure 7:
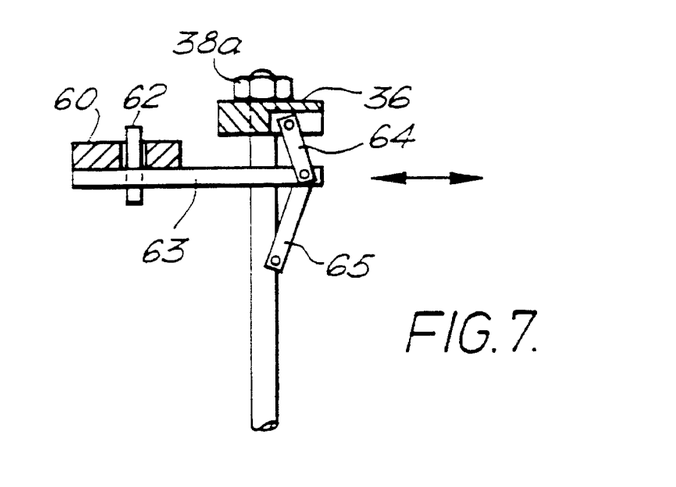
FIG. 7 is a scrap view of a part of the clamping mechanism shown in FIG. 6.

It will be appreciated that on activation of the rams 61, the ring 60 will rotate clockwise which will cause the fingers 63 to be drawn radially inwardly thereby axially extending the rods 38 momentarily and allowing the over-centre mechanism 64,65 to move from its unlocked position shown in FIG. 7 to an opposite locked position (not shown) in which the links 64 and 65 have moved to the left to draw the ring 36 into engagement with the bolts 38 and place the ring 36 under pressure.

Rotation of the ring 60 in the opposite direction (anticlockwise) causes the fingers 63 to move radially outwardly and causes the over-centre mechanism 64,65 to move to its un-locked position shown in FIG. 7.

It will be appreciated that movement of the over-centre mechanism 64,65 between its locked and unlocked conditions results in the rods 38 being extended, the extension of the rods being maintained in the locked condition to clamp the two connector parts together but released in the unlocked condition.

Figure 8:
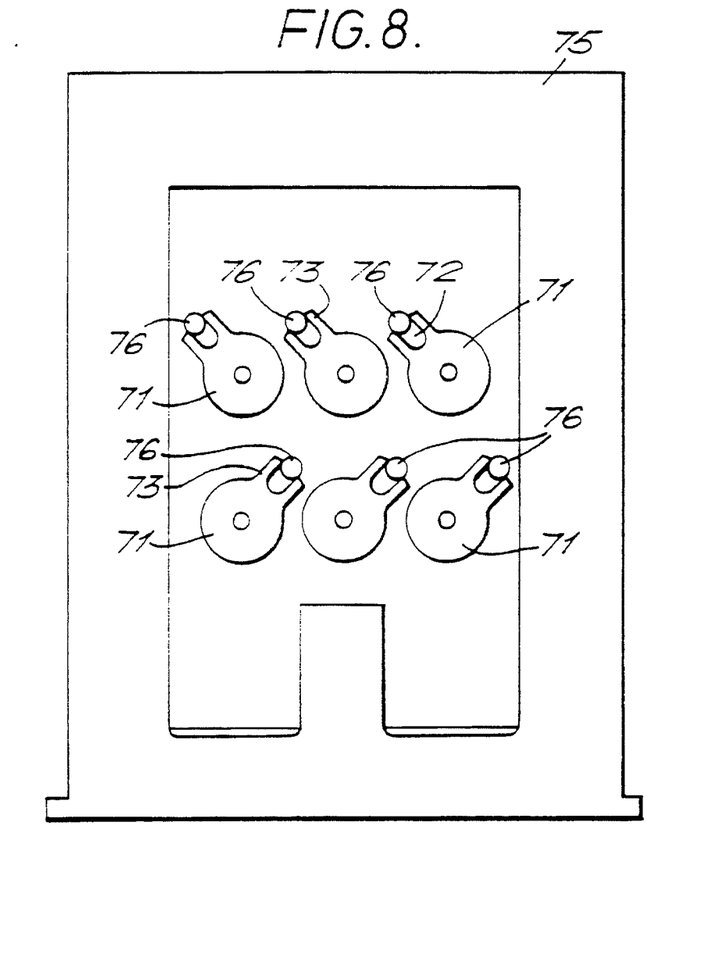
FIG. 8 is a scrap view showing an alternative valve rotating mechanism to that shown in FIG. 3.

Referring now to FIG. 8, it can be seen that there is illustrated an alternative means for rotating the valve members 15. Instead of using the gear wheel 27 and associated ring gear 16 on each valve spindle as shown in FIG. 3, this is replaced with a plate member 71 attached to each end of the valve member 15, each plate 71 having a radial extension 73 thereon in which a slot 72 is formed. A vertically movable actuator 75 provided with pegs 76 which engage in the slots 72 is positioned immediately adjacent the members 71 at each end of the valve spindles 15. It will be seen therefore that when the actuator 75 is moved vertically, the members 71 attached to the valve members 15 will be rotated. This therefore provides a simpler valve rotating mechanism to that shown in FIG. 3.

As an alternative to the locking arrangement shown in FIGS. 6 and 7, the rods 38 can be extendable by hydraulic rams (not shown) which co-operate with the upper ring 36 to move it axially away from ring 35 and thereby extend the rods 38. The hydraulic means extend the rods 38 by a distance of, for example, 6 mm which is more than the extension required. This leaves a gap into which locking chocks (not shown) can be inserted to maintain the extension on release of the hydraulic rams when the rods try to return to their original length. The purpose of the extendable rods 38 and the locking ring 35 will be described in more detail hereafter.

The ducts 13b in the female part 11 extend from its upper surface as pipes 13c provided with flanges 13d for connection to pipework (not shown) on the module 2 to convey the fluids therefrom for connection to pipeline 7 feeding the rig 8.

Referring now to FIGS. 4A-4C and 5, there is shown in more detail one of the spindle valves 15. For the avoidance of doubt, three spindle valves 15 will be provided in the female connector part 11 and three spindle valves will be provided in the male connector part 12 to extend transversely across the main bores 13a and 13b and the smaller bores 14a, 14b. FIG. 4B is a longitudinal cross section taken along the lines B—B in FIG. 3 and shows a spindle valve member 15 mounted in the block 9. As illustrated, the block 9 has three main bores 13a extending therethrough and it can be seen that the spindle valve member is stepped along its length and includes through-bores 33 in each of its stepped sections. In the position illustrated in FIG. 4B, the through-bores 33 in the spindle member 15 are axially aligned with the main bores 13a in the block thereby allowing fluid to flow through the duct 13a and through the valve member 15. Annular seals 43, 44 and 45 are located around the through-bores 33 at both their upper and lower ends. Circumferentially spaced pairs of seals of 46, 47 and 48 are provided on the stepped valve member sections on either side of the through-bores 33 and outside the seals 43, 44 and 45 as illustrated in FIGS. 4B and 4C.

FIG. 4A illustrates the position of the valve member 15 in which it permits fluid flow through the main ducts 13a whereas FIG. 4C shows the valve member 15 rotated through 90 into a position where the body of the valve member obturates the main ducts 13a and prevents fluid flow therethrough.

Referring now to FIG. 5, it will be noted that additional annular seals 49, 50 and 51 are provided on each stepped section of the valve spindle 15 between the upper and lower seals 43, 44 and 45. As illustrated, these seals 49, 50 and 51 are circumferentially spaced from the seals 40, 41 and 42 by 90. The purpose of these seals is to ensure that during the transitional period when the valve spindle 15 is rotated from its open position shown in FIG. 4A to its closed position shown in FIG. 4C, there is always a seal maintained between the valve member 15 and the block 9. It will be appreciated by reference to FIG. 4A that when the valve member 15 is rotated in the illustrated clockwise direction, the seals 43 will cease to function as soon as the valve member 15 has been rotated from its illustrated position. Seals 49 therefore provide the required seal during this transitional period.

The two-part connector just described and illustrated operates in the following way. As has already been explained, the lower male part of the connector 12 is placed on the seabed on support girders 22 which form part of the framework 3. The main ducts 13a in the lower male connector part 12 emerge from the base of the pedestal 20 as pipes (not visible) which can be permanently connected to the pipelines 5 coming from the well heads 6. This would normally be done by divers when the subsea installation shown in FIG. 1 is originally installed on the seabed. The pipes 13c which are connected to the main bores 13b in the female connector part 11 are connected to pipework (not shown) in the module 2 which is itself releasably connected to the pipeline 7 which transports the oil/gas to the rig 8.

To instal the female connector part 11 in place on the male connector part 12 on the seabed, it would be lowered from the vessel 1 on to the male connector part 12. The scroll surfaces 18 on the male part 12 guide the female part 11 into its correct orientation so that the bores 13a and 14a in the male part are exactly aligned with the bores 13b and 14b in the female part. In the case of the FIG. 3 arrangement, while the female part is being lowered on to the male part 12, the gear wheels 27 locate in the slots 17 and their drive shafts 28 locate in the slots 23 adjacent the recesses 17. When the female part 11 is fully lowered into position, the teeth on the gear wheels 27 engage with the respective ring gears 16a on the valve members 15a in the male connector part 12. In the case of the FIG. 6 embodiment, as the top female connector part 11 is lowered into position, the lower pegs 76 on the two actuators 75 engage in the slots 72 in the plate members 71 on the lower male connector part 12. When the female connector part 11 has reached its fully lowered position, the sealing face 24a on the male connector part 12 will engage with the sealing face 24b on the female part 11 and the latching projections 37 on the lower annular ring 35 on the female part 11 will lie between the locating anchoring projections 29 around the base of the male part 12. The female part 11 is then rotated to place the latching projections 37 beneath the anchoring projections 19.

At this stage in the assembly, the two connector parts 11,12 are loosely fitted together. It is now necessary to form a seal between them and this is achieved by activating the hydraulic rams 61 (see FIG. 6). This rotates the ring 60 and extends the rods 38 provided around the periphery of the female connector part 11. This extension in the length of the rods 38 draws the two connector parts 11,12 together to exert a pressure thereon sufficient to provide the required fluid seal between the two connector parts. It is estimated that an extension of about 6 mm will provide a pressure of about 7.500 p.s.i. on the two connector parts 11, 12 drawing them together.

Should a fault develop in any of the equipment in the module 2 or should it need servicing, the whole module 2 can be removed from the subsea assembly and lifted up to the surface to be replaced by another module. The removed module can then be sent back to a shore based installation such as that shown in FIG. 2 for testing and identification and rectification of the fault. In order to release the module 2 from the subsea assembly, the mechanism for extending the rods 38 would be operated again to extend them by an amount sufficient to allow the locking mechanism such as the over-centre arrangement shown in FIG. 7 to be released. The rods therefore contract again to their original length and the tension holding the two connector parts 11,12 together is thereby released. The female part 11 can then be rotated to place the castellations 37 between the projections 19 on the male 12 part and the module can then be lifted up from the subsea assembly and removed to the surface by the vessel 1 after the underwater connections between the pipework on the module 2 and the subsea pipework 5 and 7 has been released from the surface. Installation of a new module 2 in the system would involve the reverse of the process just described.

The preferred connector can connect up to six 8" diameter pipes 13 and five 4" pipes 14 through a self aligning vertical connection. The clamping mechanism holds the two halves of the connector together mechanically to resist internal pressures and also to provide a structural connection capable of resisting module and side current loadings.

The valving system can preferably also include a fail-safe locked facility in its separated mode whereby the valving in both connector parts is capable of being opened only when the two connector parts are latched together.

The actuation functions are preferably hydraulically controlled but they could be electrically operated if desired. Each function will preferably have a secondary back up so there will be no requirement for diver intervention to position a module 2 in subsea assembly or remove it therefrom.

Referring now to the connector shown in FIGS. 9–14, it is very similar in construction to that just described with respect to FIG. 1–8 except that the locking rods 38 are exposed and no longer contained within an external sleeve thus making a substantial saving on material and overall weight. Also the mechanism used to rotate the valve spindles 15 uses the principle shown in FIG. 8 rather than that shown in FIG. 3. The means for extending the locking rods 38 and maintaining them in their locked extended condition is however substantially the same as that shown in FIG. 6.

The modified two part connector shown in FIGS. 9–14 will now be described in more detail using the same reference numerals for the same parts already described with reference to FIGS. 3–8.

The upper female connector 11 has a body 9b in which are formed two sets of ducts 13b arranged parallel to each other with a set of smaller diameter ducts 14b located between them. The upper connector part 9b includes an annular body section 9c in which extension rods 38 are mounted for axial movement in suitably dimensioned apertures spaced equidistantly around the periphery thereof. The top end of each rod 38 is located in a ring 36 and secured by means of nuts 38a. The other end of each rod 38 is screwed into a tapped hole 80 in a lower ring 37 (see FIG. 11).

Figure 10:
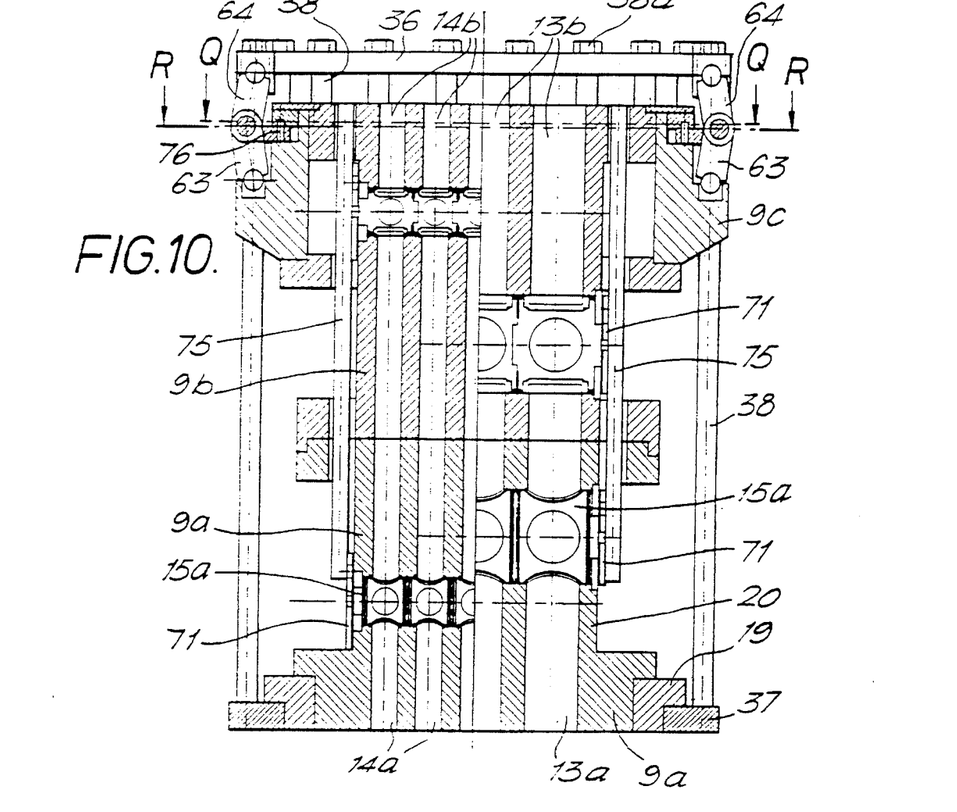
FIG. 10 is a section on the line Z—Z in FIG. 12.
Figure 11:
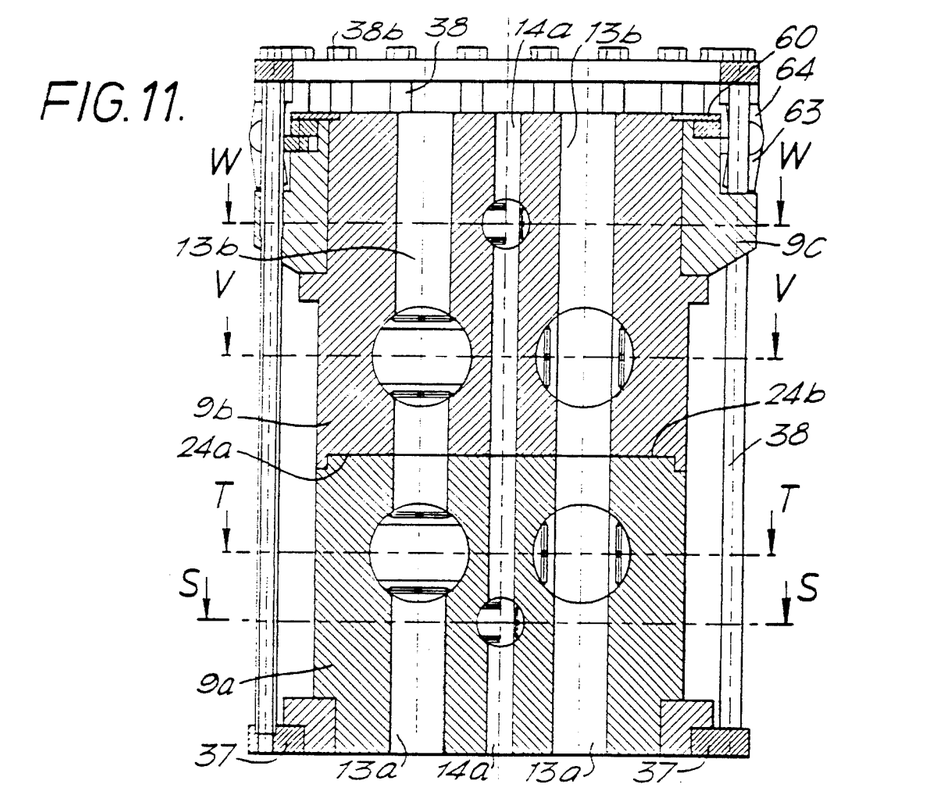
FIG. 11 is a section on the line X—X in FIG. 13.
Figure 12:
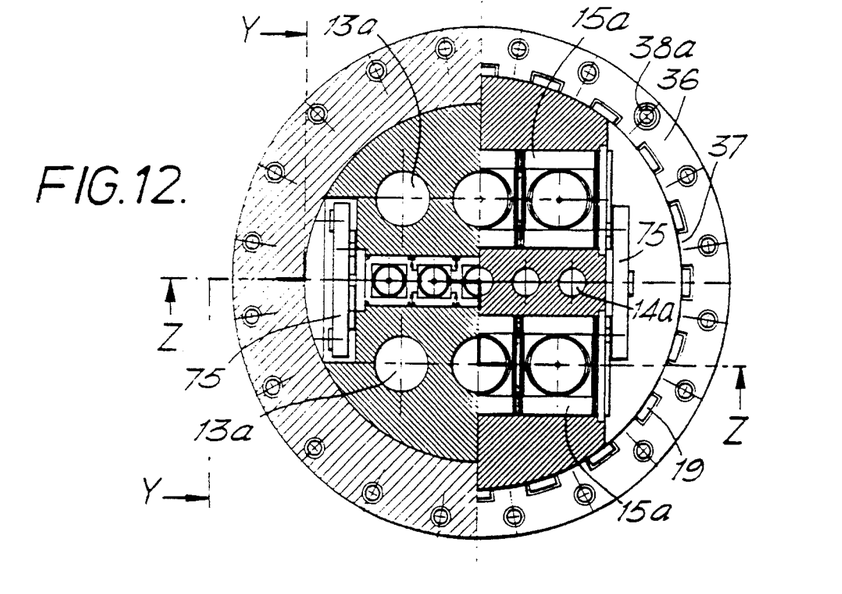
FIG. 12 is a half section on the line W—W in FIG. 11 and a half section on the line V—V in FIG. 11.
Figure 13:
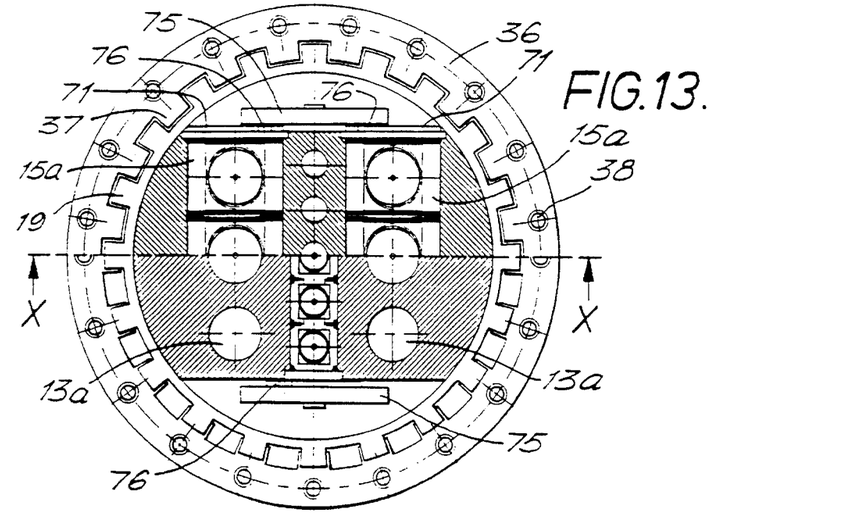
FIG. 13 is a half section on the line S—S in FIG. 11 showing the connector in its locked condition and a half section on the line T—T in FIG. 11 showing the connector in its unlocked condition.
Figure 14:
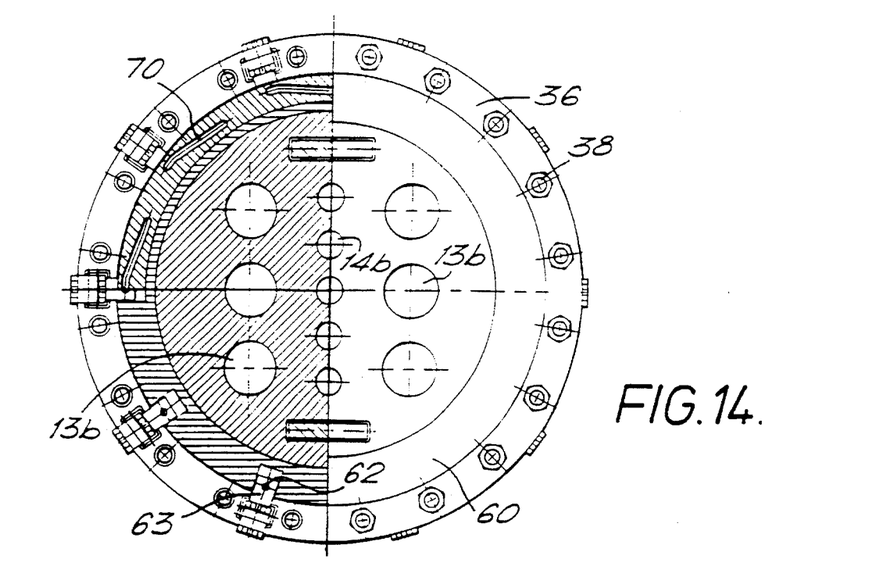
FIG. 14 is a quarter section on the line Q—Q in FIG. 10, a quarter section on the line R—R in FIG. 10 and a half top view.

FIG. 10 shows a rotatable ring 60 having a plurality of slots 70 therein shaped as illustrated in FIG. 14 fitted to the top of the body section 9c. The ring 60 is rotatable by hydraulic rams (not shown) or any other suitable means. Radially movable fingers 63 (see FIGS. 10 and 14) are circumferentially located around the periphery of the connector below the rotatable ring 60 and each finger has an upstanding peg 62 at its inner end which engages in one of the slots 70. The outer end of each finger 63 is connected to an over-centre lever mechanism such as illustrated in FIG. 7 which comprises an upper link 64 pivotally attached at one end to the finger 63 and at its other end to the ring 36 and a lower link 65 which is pivotally attached at the one end to the finger 63 and at its other end to the body section 9c of the upper part of the connector. The ring is rotated by power means such as hydraulic rams (not shown) in a similar manner as has already been described with reference to FIG. 6.

Figure 9:
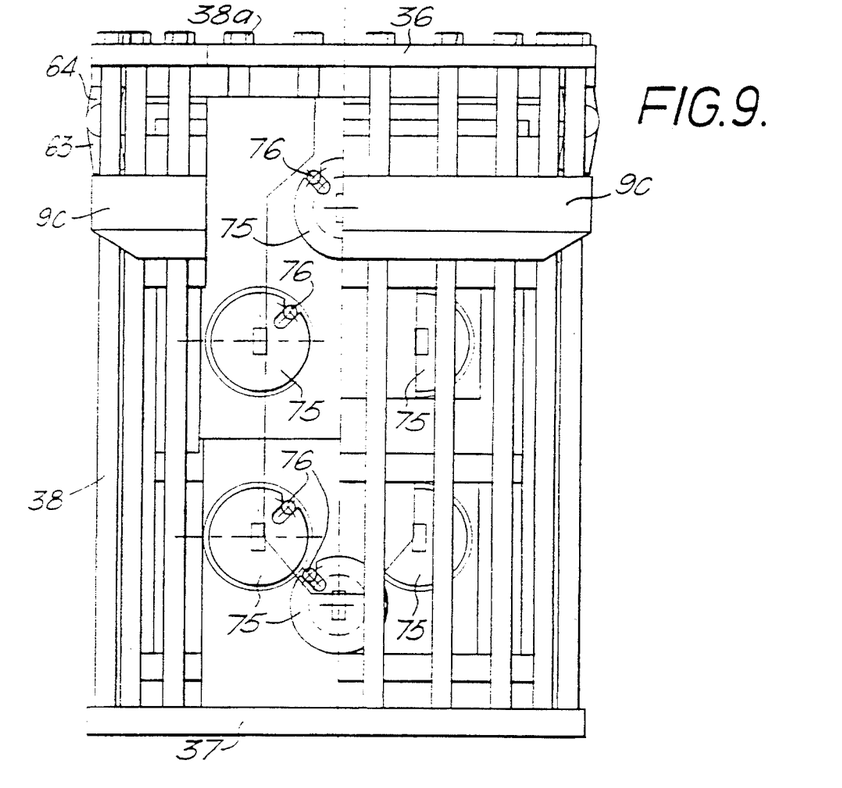
FIG. 9 is a section on the line Y—Y in FIG. 12.

The lower male connector 12 has a body section 9a having a pedestal 20 around which castellated projections 19 are provided to cooperate with corresponding projections 37 provided around the lower ring 35. Six main bores or ducts 13a extend vertically through the block 9a parallel to the longitudinal axis thereof and parallel to each other. These ducts are arranged in lines or sets of three as illustrated. Five smaller ducts 14a arranged in a line or set also extend through the block 9b parallel to each other and parallel to the longitudinal axis of the block. The block 9a has an upper surface 24a which engages with a corresponding surface 24b on the upper connector 9b.

A respective rotatable spindle valve member 15a extends normally through each main duct 13a and each smaller duct 14a. Each spindle has through-bores 33 (see FIG. 12) in it which align in a first position with the main ducts 13a or smaller ducts 14a to permit fluid flow therethrough. Each spindle valve 15a is rotatable through 90 about its longitudinal axis to rotate its through-bores 33 to a second position in which the body of the spindle valve 15a obturates the main and smaller ducts 13a and 14a in the block 9a and thereby prevents fluid flow therethrough. Each spindle valve 15a is of the construction illustrated which is the same as that already described with reference to FIGS. 3–8.

Rotation of the ring 60 in an anticlockwise direction by the moving means (not shown) will draw the fingers 63 radially inwardly thereby causing the links 64 and 65 to move radially inwardly and the ring 36 vertically against the bolts 38a. This causes the rods 38a to be extended in length. Once the over-centre mechanism has moved past its over-centre position, the links 64,65 are placed in compression by the pressure exerted on them by the ring 36 and they lock in position to keep the rods 38 in their extended state.

Rotation of the ring 60 in the opposite clockwise direction causes the fingers 63 to move radially outwardly and the over-centre mechanism 64,65 to move to its un-locked position in which the ring 36 no longer exerts a pressure on the bolts 38a so the rods 38 can return to their original length.

The actuator mechanism for rotating the spindle valves 15a is of the general type shown in FIG. 8 in that a disc 71 with a radial slot 72 therein is attached to each end of each spindle valve 15a. A vertically movable actuator or slider plate 75 provided with pegs 76 which engage in the slots 72 is positioned immediately adjacent the discs 71 at each end of the valve spindles 15a. It will be seen therefore that when the actuator 75 is moved vertically, the discs 71 attached to the spindle valves 15a will be rotated by the pegs 76 and thus the spindle valves 15a will also be rotated.

To instal the female connector part 11 in place on the male connector part 12 on the seabed, it would be lowered from the vessel 1 on to the male connector part 12. A scroll surface (not shown) on the male part 12 guides the female part 11 into its correct orientation so that the bores 13a and 14a in the male part are exactly aligned with the bores 13b and 14b in the female part. As the top female connector part 11 is lowered into position, the lower pegs 76 on the actuators 75 engage in the slots 72 in the discs 71 the valve spindles 15a on the lower male connector part 12. When the female connector part 11 has reached its fully lowered position, its sealing face 24b will engage with the sealing face 24a on the male part 11 and the latching projections 37 on the lower annular ring 35 on the female part 11 will lie between the locating anchoring projections 19 around the base of the male part 12. The female part 11 is then rotated to place the latching projections 37 beneath the anchoring projections 19.

At this stage in the assembly, the two connector parts 11,12 are loosely fitted together. It is now necessary to form a seal between them and this is achieved by activating drive means (not shown) to rotate the ring 60 and extend the rods 38 provided around the periphery of the female connector part 11. This extension in the length of the rods 38 draws the two connector parts 11,12 together to exert a pressure thereon sufficient to provide the required fluid seal between the two connector parts. It is estimated that an extension of about 6 mm will provide a pressure of about 7.500 p.s.i. on the two connector parts 11,12 drawing them together. Once extended, the rods 38 are maintained in this condition by the over-centre mechanisms 64,65 as has already been described.

Should a fault develop in the two part connector or should it need servicing, the female connector 11 can be removed from the male connector 12 on the subsea assembly and lifted up to the surface to be replaced by another one. The removed connector part can then be sent back to a shore based installation such as that shown in FIG. 2 for testing and identification and rectification of the fault. In order to release the female connector part 12 from the subsea assembly, the mechanism for extending the rods 38 would be operated again to extend them by an amount sufficient to allow the over-centre locking mechanism 64,65 to be released. The rods therefore contract again to their original length and the tension holding the two connector parts 11,12 together is thereby released. The female part 11 can then be rotated to place the castellations 37 between the projections 19 on the male part 12 and the module can then be lifted up from the subsea assembly and removed to the surface by the vessel 1.

I claim:

1. A two-part connector for use in connecting and disconnecting fluid carrying conduits, said connector comprising:

male and female connector parts, each part having at least one non-radially disposed fluid carrying bore extending therethrough, the at least one bore in the male part being aligned with the at least one bore of the female part when the two connector parts are assembled together;

at least one valve member rotatably mounted in each connector part and having a body and at least one through-hole extending through said body, said at least one valve member being mounted in each connector part so as to extend across said at least one bore of said connector part and said at least one valve member being rotatable about an axis extending transversely with respect to said at least one bore, said at least one through-hole being disposed relative to said at least one bore such that when said at least one valve member is rotated about said axis to a first position said at least one through-hole is aligned with said at least one bore to permit fluid flow therethrough and when said at least one valve member is rotated about said axis to a second position said at least one through-hole is disaligned from said at least one bore and said body obturates said at least one bore to prevent fluid flow therethrough;

at least one annular seal surrounding said at least one through-hole and cooperating with the connector part in which said at least one valve member is rotatably mounted to make a seal therewith; and releasable clamping means to retain the two connector parts together in sealing engagement, said clamping means including a plurality of elongate tensioning members, means operable to extend said tensioning members to an extended state and to lock said tensioning members in said extended state so as to clamp said two connector parts together under a pressure sufficient to provide a requisite fluid seal between said two connector parts, said tensioning members being steel rods loosely connected at each end to a top and a bottom ring, and locking means being provided to engage with the top ring to maintain the rods in said extended state.

2. A connector as claimed in claim 1, wherein a plurality of bores are provided in each connector part, the bores in each of the male and female connector parts being axially aligned in sets with a single valve member extending across all the bores in each set.

3. A connector as claimed in claim 2, wherein the connector has a longitudinal axis and all the bores are parallel with said longitudinal axis along the whole of their length.

4. A connector as claimed in claim 2, wherein each valve member is a spindle, and said connector includes drive means for rotating one of the spindles in the female connector part, first gear means associated with said spindle which, in use, mesh with second gear means provided on said spindles in the male connector part when the two connector parts are clamped together by the releasable clamping means.

5. A connector as claimed in claim 4, wherein the first gear means is a gear wheel mounted on the female connector valve spindle and the second gear means is a ring gear provided on the spindles in the male connector part which meshes with said gear wheel.

6. A connector as claimed in claim 2, wherein each valve member has a rotatable drive member provided thereon which includes a slot radially offset with respect to the axis of rotation of the valve member, said offset slot being adapted to receive a projection provided on an actuator movable in a plane generally normal to the axis of rotation of the valve member when the two connector parts are clamped together, the linear movement of said actuator resulting in rotation of the valve members.

7. A connector as claimed in claim 6, wherein the actuator is movable between a closed position in which the valve members obturate the bores and prevent fluid flow therethrough and an open position allowing the fluid flow.

8. A connector as claimed in claim 6, wherein an actuator is provided at both ends of each valve member.

9. A connector as claimed in claim 2, wherein annular seals are circumferentially located between each through-hole of the valve members to co-operate with the connector part in which said valve members are rotatably mounted and make a seal therewith.

10. A connector as claimed in claim 1, wherein the male connector part has a sealing surface adapted to co-operate with a sealing surface on the female connector part to make a metal to metal seal therewith.

11. A connector as claimed in claim 1, wherein the clamping means includes anchor means provided on one of the connector parts which are engaged by latching means on the other connector part, the arrangement being such that on initial activation of the clamping means, the latching means is caused to move axially against the anchor means to draw the two connector parts together.

12. A connector as claimed in claim 1, wherein the locking means are locking chocks which engage with the top ring.

13. A connector as claimed in claim 1, wherein the female connector part has a body and the locking means comprise over-centre means which act between the top ring and the body of the female connector part.

* * * * *